United States Patent
Razak (10) Patent No.: US 11,391,209 B2
(45) Date of Patent: Jul. 19, 2022

(54) GAS TURBINE ENGINE

(71) Applicant: ROLLS-ROYCE plc, London (GB)

(72) Inventor: Ahmed M Y Razak, Derby (GB)

(73) Assignee: ROLLS-ROYCE PLC, London (GB)

( * ) Notice: Subject to any disclaimer, the term of this patent is extended or adjusted under 35 U.S.C. 154(b) by 290 days.

(21) Appl. No.: 16/694,047

(22) Filed: Nov. 25, 2019

(65) Prior Publication Data

US 2020/0173301 A1 Jun. 4, 2020

(30) Foreign Application Priority Data

Nov. 30, 2018 (GB) ...................................... 1819564
Nov. 30, 2018 (GB) ...................................... 1819565

(51) Int. Cl.
*F02C 7/10* (2006.01)
*F02C 3/06* (2006.01)
(Continued)

(52) U.S. Cl.
CPC ................ *F02C 7/10* (2013.01); *F01D 13/02* (2013.01); *F01D 25/10* (2013.01); *F02C 3/06* (2013.01);
(Continued)

(58) Field of Classification Search
CPC .. F01D 13/02; F01D 25/10; F02C 3/06; F02C 6/00; F02C 6/18; F02C 7/10; F05D 2220/32; F05D 2220/74; F05D 2260/20; F05D 2260/211; F05D 2260/213; Y02E 20/16; Y02T 50/60
See application file for complete search history.

(56) References Cited

U.S. PATENT DOCUMENTS 2,814,181 A   11/1957   Schwartz
3,791,137 A *  2/1974   Jubb .................... F02C 1/05
                                            60/39.463
(Continued)

FOREIGN PATENT DOCUMENTS

DE      28 48 424 A1   5/1980
WO   WO9704228 A1   2/1997

OTHER PUBLICATIONS

Search Report of the Intellectual Property Office of the United Kingdom for GB1819564.4 with search date of May 15, 2019.
(Continued)

*Primary Examiner* — Jesse S Bogue
(74) *Attorney, Agent, or Firm* — Oliff PLC (57) ABSTRACT

A combined cycle heat engine (10). The engine (10) comprises a first gas turbine engine (11) comprising a first air compressor (14), a first combustion system (16, 20) and a first turbine system (18, 22), and a second gas turbine engine (32) comprising a second air compressor (36) and a second turbine system (40). The engine further comprises a heat exchanger (38) configured to transfer heat from an exhaust of the first turbine system (18, 22) to compressed air from the second air compressor (36). The first combustion system comprises a first combustor (16) provided downstream of the first air compressor (14) and upstream of the first turbine system (18, 22), and a second combustor (20) downstream of a first turbine section (18) of the first turbine system and upstream of a second turbine section (22) of the first turbine system.

18 Claims, 5 Drawing Sheets

(51) Int. Cl.
*F02C 6/18* (2006.01)
*F01D 13/02* (2006.01)
*F01D 25/10* (2006.01)

(52) U.S. Cl.
CPC ............ *F02C 6/18* (2013.01); *F05D 2220/32* (2013.01); *F05D 2220/74* (2013.01); *F05D 2260/20* (2013.01); *F05D 2260/211* (2013.01); *F05D 2260/213* (2013.01)

(56) References Cited

U.S. PATENT DOCUMENTS

| | | | | | |
|---|---|---|---|---|---|
| 4,147,024 | A | * | 4/1979 | Moellmann | F02C 7/10 60/39.15 |
| 4,550,562 | A | * | 11/1985 | Rice | F01K 23/10 60/783 |
| 4,571,935 | A | * | 2/1986 | Rice | F02C 6/18 60/39.182 |
| 4,813,227 | A | * | 3/1989 | Rice | F01K 23/103 60/774 |
| 4,896,499 | A | * | 1/1990 | Rice | F02C 6/003 60/39.182 |
| 5,813,215 | A | * | 9/1998 | Weisser | F02C 6/003 60/39.181 |
| 6,817,187 | B2 | * | 11/2004 | Yu | F02C 7/12 60/774 |
| 8,164,208 | B2 | * | 4/2012 | Rosson | F02C 6/003 290/52 |
| 9,624,829 | B2 | * | 4/2017 | Lebel | F02C 3/10 |
| 2005/0056001 | A1 | * | 3/2005 | Frutschi | F02C 6/18 60/39.182 |
| 2009/0301054 | A1 | * | 12/2009 | Simpson | F01K 23/10 60/39.15 |
| 2012/0000204 | A1 | * | 1/2012 | Kesseli | F02C 3/107 60/778 |
| 2012/0042656 | A1 | * | 2/2012 | Donnelly | F01K 23/10 60/39.511 |
| 2016/0047307 | A1 | * | 2/2016 | Williamson | F02C 7/06 60/726 |
| 2017/0298816 | A1 | | 10/2017 | Razak et al. | |

OTHER PUBLICATIONS

Czaja, D. et al., "Selection of Gas Turbine Air Bottoming Cycle for Polish compressor stations," Journal of Power Technologies, 2013, vol. 93, No. 2, pp. 67-77.
Apr. 14, 2020 extended Search Report issued in European Patent Application No. 19206261.0.
U.S. Appl. No. 16/694,134, filed Nov. 25, 2019 in the name of Razak, A. et al.
Mar. 31, 2020 Search Report issued in European Patent Application No. 19 20 6263.
Czaja, D. et al., "Operation of a Gas Turbine Air Bottoming Cycle at Part Load," Journal of Power Technologies, vol. 93, No. 5, 2013, pp. 279-286.
May 15, 2019 Search Report issued in British Patent Application No. 1819565.1.
Apr. 28, 2022 Office Action issued in connection with European Application No. 19 206 261.0.

* cited by examiner

GAS TURBINE ENGINE

CROSS-REFERENCE TO RELATED APPLICATIONS

This application claims the benefit of United Kingdom Patent Application No. 1819564.4 filed Nov. 30, 2018, and United Kingdom Application Patent Application No. 1819565.1 filed Nov. 30, 2018, the disclosures of which are herein incorporated by reference in its entirety.

TECHNICAL FIELD

The present disclosure concerns a combined cycle gas turbine engine.

BACKGROUND

Combined cycle gas turbine engines are known, and are typically used to increase the thermal efficiency of heat engines relative to simple cycle gas turbine engines.

In a combined cycle gas turbine engine, waste exhaust heat from a gas turbine engine is used to drive a second heat engine to produce additional net power, without increasing fuel burn.

One such cycle is known as an "Air Bottoming Cycle" (ABC). Air bottoming cycles incorporate a further Brayton cycle gas turbine engine as the second heat engine. Typically, the second engine comprises a compressor, a heat exchanger, and a turbine in flow series. The compressor draws in air and compresses it. This compressed air is heated by waste exhaust heat from the first gas turbine engine, before being expanded by the turbine. The turbine powers the compressor and a load, to provide net power.

Such cycles are disclosed for example in "Selection of Gas Turbine Air Bottoming Cycle for Polish compressor stations", by Daniel Czaja, Tadeusz Chmielniak, Sebastian Lepszy, published in the Journal of Power Technologies 93 (2) (2013) 67-77.

According to a first aspect there is provided a combined cycle heat engine comprising:
  a first gas turbine engine comprising a first air compressor, a first combustion system and a first turbine system;
  a second gas turbine engine comprising a second air compressor and a second turbine system; and
  a heat exchanger configured to transfer heat from an exhaust of the first turbine system to compressed air from the second air compressor; wherein
  the first combustion system comprises a first combustor provided downstream of the first air compressor and upstream of the first turbine system, and a second combustor downstream of a first turbine section of the first turbine system and upstream of a second turbine section of the first turbine system.

Advantageously, by providing a combined cycle gas turbine engine having first and second combustors provided between turbine stages of the first gas turbine engine, greatly increased efficiency can be provided relative to both simple cycle gas turbine engines, and conventional combined cycle gas turbines. Further benefits and features of the disclosed system are set out below.

The first air compressor and the first and second sections of the first turbine system may be mechanically coupled by a common turbine shaft.

The first combustor may be provided downstream of the first compressor and upstream of the first turbine rotor of the first turbine system, and the second combustor may be provided downstream of a first turbine rotor of the first turbine system, and upstream of a second turbine rotor of the first turbine system.

Alternatively, the first turbine system may comprise a first turbine shaft mechanically coupled to a first turbine spool of the first turbine system and the first compressor of the first gas turbine engine, and a second turbine shaft mechanically coupled to a second turbine spool of the first turbine system and an external load.

The first turbine section may be coupled to the first turbine shaft and the second turbine section may be coupled to the second turbine shaft.

The first air compressor may comprise a low pressure compressor provided upstream of a high pressure compressor. The first turbine shaft may be mechanically coupled to the high pressure compressor and the second turbine shaft may be mechanically coupled to the low pressure compressor.

The second air compressor may comprise a multi-stage compressor, comprising two or more rotor stages. The second gas turbine engine may comprise one or more intercooler, configured to reject heat from the second air compressor, between rotor stages. Advantageously, compressor work is decreased, while the temperature rise in the heat exchanger is increased, thereby increasing thermal efficiency of the second gas turbine engine.

The second gas turbine engine may comprise a second combustion system provided downstream of the heat exchanger, and upstream of the second turbine system.

The second gas turbine engine may comprise an overall pressure ratio of between 4 and 15, and may comprise an overall pressure ratio of between 5 and 10. It has been found that the highest overall thermal efficiency of the system is achieved at overall pressure ratios of the second gas turbine of these values.

A pressure ratio of the first turbine section of the first turbine system may be between 2 and 5, and may be between 3.5 and 4.75. It has been found that a turbine having a pressure ratio of these values prior to the second combustor has been found to result in high exhaust temperatures of the first gas turbine, which results in a relatively high specific work, and so high overall power density.

A pressure ratio of the first turbine section of the first turbine system may be between 1 and 2, and may be approximately 1.5. It has been found that a turbine having an expansion ratio of these values prior to the second combustor has been found to result in high overall energy efficiency.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Figure 1:
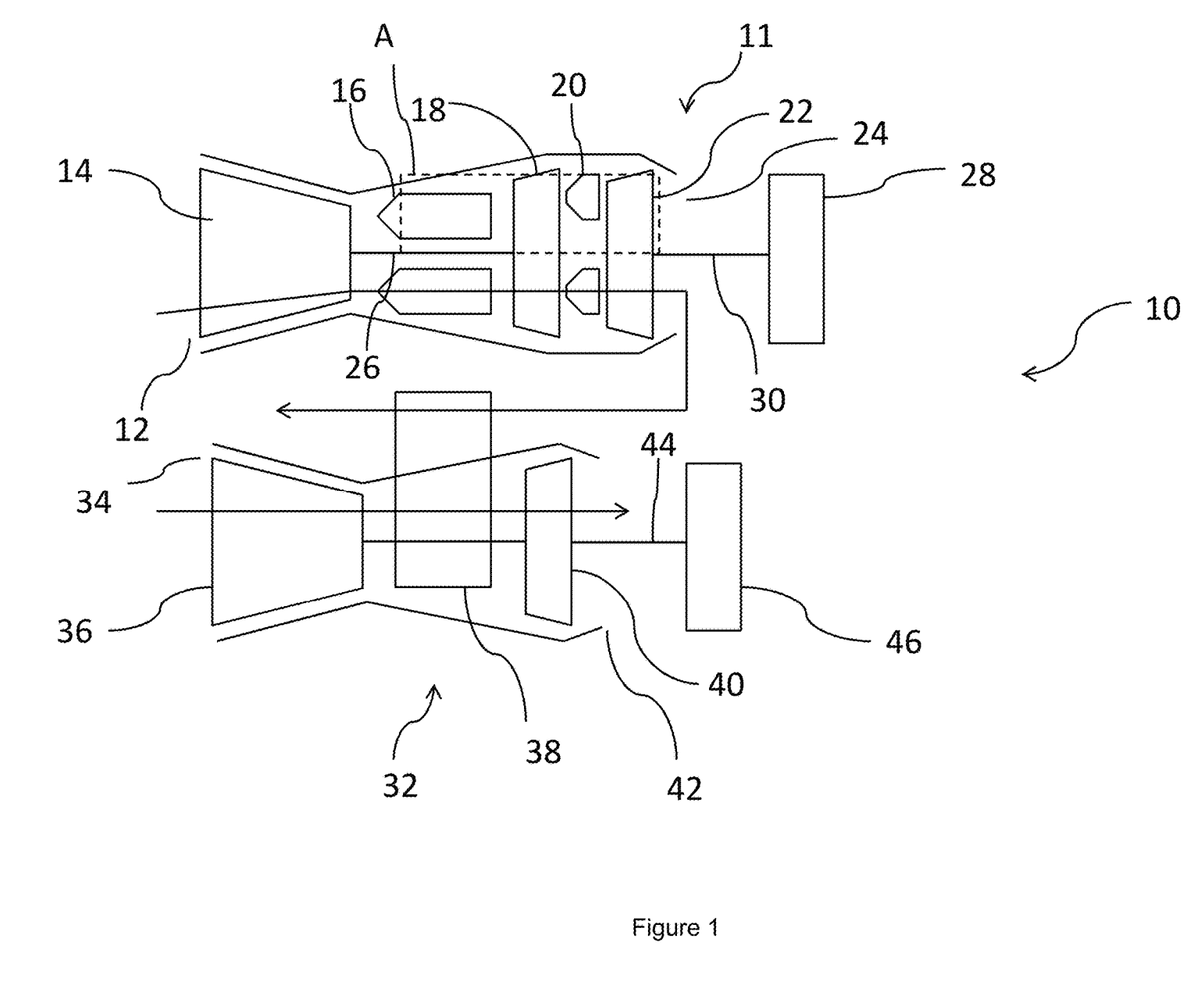
FIG. 1 is a schematic view of a first combined cycle heat engine.

With reference to FIG. 1, a first combined cycle heat engine is generally indicated at 10.

The combined cycle heat engine 10 comprises first and second Brayton cycle gas turbine engines, 11, 32, each having a respective principal and rotational axis. The first gas turbine engine 11 comprises, in axial flow series, an air intake 12, a first air compressor 14, a first combustor 16 of a first combustion system, a first turbine system comprising a first turbine section 18, a second combustor 20 of the first combustion system, a second turbine section 22 of the first turbine system, and an exhaust nozzle 24.

In operation, air entering the intake 12 is directed to the first air compressor 14, which compresses the air flow directed into it before delivering that air to the first combustor 16 where it is mixed with fuel and the mixture combusted. The resultant hot combustion products then expand through, and thereby drive the first turbine section 18, before being directed to the second combustor 20. The second combustor 20 adds further fuel to the air flow, where it is combusted to further raise the heat of the combustion products, before directing this gas flow to the second turbine section 22.

The first turbine section 18 and compressor 14 are coupled together by a core shaft 26, such that the first turbine section 18 drives the compressor 14. The second turbine section 22 is coupled to a load such as an electrical generator 28 by a power shaft 30. Consequently, the shafts 30, 26, and so the turbines 18, 22 turn independently of one another.

A heat exchanger 38 is also provided, downstream of the nozzle 24. The heat exchanger 38 comprises hot and cold sides in thermal contact with one another, and is configured to transfer heat from a first gas flow from the exhaust nozzle 24 of the first gas turbine engine 11, downstream of the first and second turbine sections 18, 22, to a second, relatively cooler gas flow. In use, gas flows from the nozzle 24, through the heat exchanger 38, thereby heating the second gas flow, before being vented to atmosphere. Optionally, further heat exchangers may be provided, such that the exhaust heat can be utilised for further purposes, such as water heating.

The combined cycle heat engine 10 further comprises a second Brayton cycle gas turbine engine 32. The second gas turbine engine comprises, in fluid flow series, an air inlet 34, a second air compressor 36, a cold side of the heat exchanger 38, a second turbine system 40, and an exhaust nozzle 42.

In operation, air entering the intake 34 of the second gas turbine engine 32 is directed to the second air compressor 36, which compresses the air flow directed into it before delivering that air to the cold side of the recuperator heat exchanger 38, where it is heated by waste heat from the exhaust of the first gas turbine engine 11. The heat exchanger 38 adds heat to the air flow (which comprises the second air flow of the heat exchanger 38), to raise the temperature of the air flow, before directing this gas flow to the turbine 40. This airflow drives the turbine 40, before being vented to atmosphere. It will be understood that the airflows through the heat exchanger are kept separate, though heat is exchanged between them. Again, further heat exchangers may be provided to utilise this high temperature air. Alternatively, the high temperature air may be utilised for space heating, since the air contains no combustion products.

The turbine 40 and compressor 36 are coupled together by a core shaft 44, such that the turbine 40 drives the compressor 36. The shaft 44 is also coupled to a load such as an electrical generator 46, such that the second gas turbine provides net external power to a load.

It has been found that the above described arrangement can provide for a very high overall thermal efficiency combined cycle heat engine. In studies, the engine has been found to have an overall thermal efficiency of up to 55%, while providing a highly compact, power dense arrangement. Since the combined cycle engine operates on air as the working fluid for both the first and second Brayton cycle gas turbine engines, no additional working fluid, such as distilled water, is required, making the system suitable for use on ships. The loads 28, 46 could be replaced by other suitable loads such as propulsive propellers or fans for ships or aircraft, since the high power density and high efficiency makes this cycle suitable for such applications.

Figure 2:
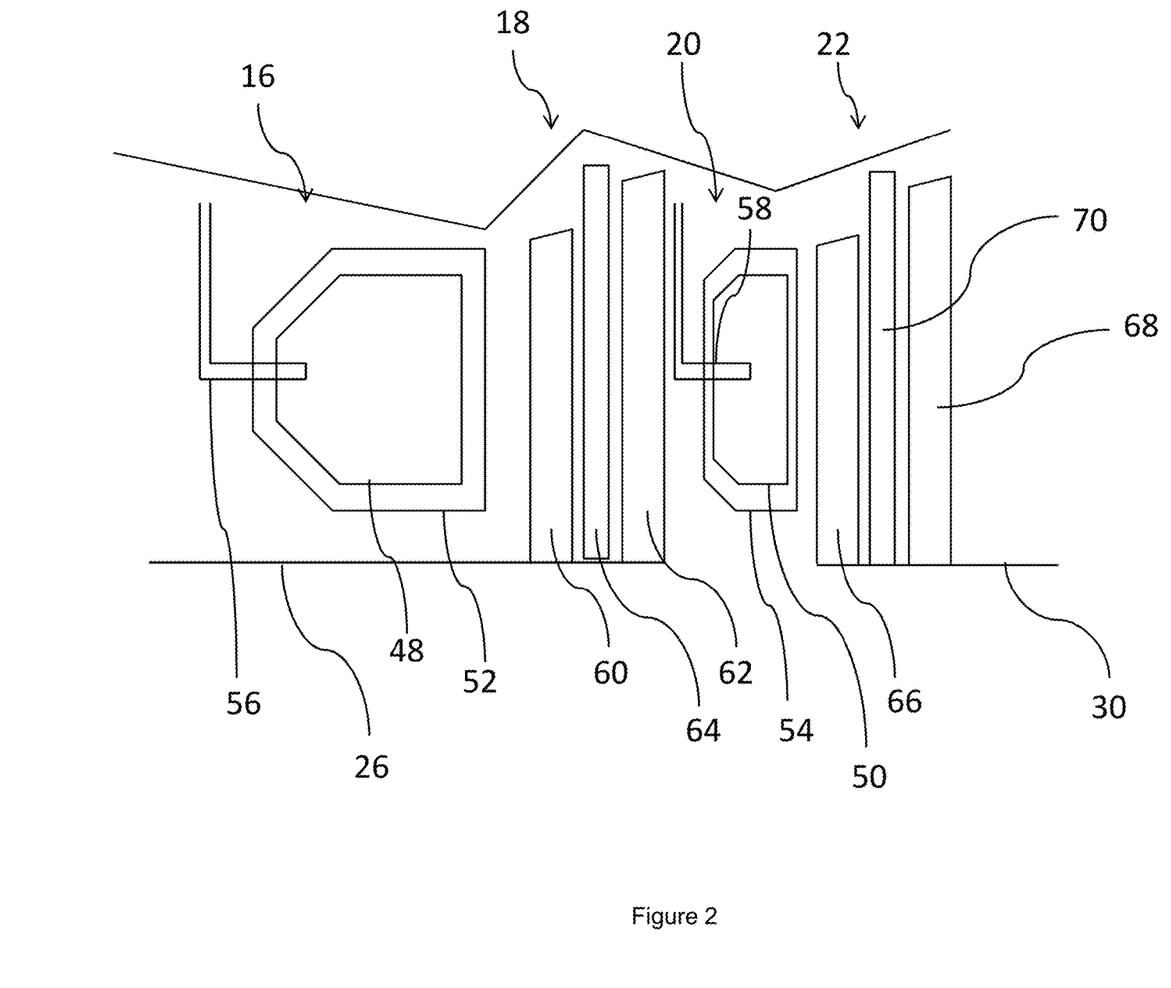
FIG. 2 is a schematic view of the region A of the first gas turbine engine of the combined cycle heat engine of FIG. 1.

Referring now to FIG. 2, which shows the area A of FIG. 1, the first and second combustors 16, 20 and first turbine section 18, 22 are shown in more detail.

As can be seen, each combustor 16, 20 is relatively conventional, comprising an inner combustor liner 48, 50 surrounded by an outer combustor casing 52, 54. Each combustor 16, 20 further comprises a respective fuel injector 56, 58, which provides fuel such as aviation fuel or diesel, for burning within the gas flow. Alternative combustor types may also be utilised, such as reverse flow combustors, lean burn stages combustors, and Rich-Quench-Lean (RQL) combustors. Other fuel types may also be used, such as natural gas.

Each turbine section 18, 22 comprises one or more turbine stages. A turbine stage comprises at least one turbine rotor, and optionally, one or more turbine stators. As shown, the first turbine section 18 comprises first and second turbine rotors 60, 62, with a turbine stator 64 provided therebetween. In use, the turbine rotors 60, 62 (which are conventionally bladed rotors), rotate to provide motive power, while the stators redirect gas flow downstream of each rotor to guide the gas flow to the next rotor. Consequently, the first turbine section 18 in this example has two turbine stages. Similarly, the second turbine section 22 has two turbine stages, comprising two turbine rotors 66, 68 and a turbine stator 70 therebetween. As can be seen, in this case, the first turbine section 18 is provided as part of a first spool, coupled to the first shaft 26, while the second turbine section 22 is provided as part of a second spool, coupled to the second shaft 30.

The number of turbine stages is selected to provide the desired turbine pressure ratio at the desired shaft rotational speed for the maximum gas flow, utilising the minimum number of stages, as will be understood by the skilled person.

In studies, the inventors have found that particular turbine pressure ratios of the first turbine section provide particular advantages. The pressure ratio of a turbine or turbine section can be found by dividing the pressure at the inlet of the turbine (i.e. upstream of the first turbine stage of the turbine or turbine section) by the pressure at the outlet of the turbine (i.e. downstream of the final turbine stage of the turbine or turbine section).

It has been found that power density of the full system can be maximised by providing a first turbine section having a pressure ratio of between 2 and 5. This can typically be provided by a two stage turbine section. In some cases, an optimum power density can be provided by providing a first turbine section having a pressure ratio of between 3.5 and 4.75. This relationship appears to hold for a wide range of turbine entry temperatures and overall pressure ratios. Consequently, where power density (i.e. weight and/or size of the engine is the most important factor in the engine design), then turbines having the above properties should be selected.

On the other hand, thermal efficiency (and so fuel economy) can be maximised by providing a first turbine section having a pressure ratio of between 1 and 2. This can typically be provided by a single stage turbine section. In some cases, optimum energy efficiency can be provided by providing a first turbine section having a pressure ratio of approximately 1.5. Again, this relationship appears to hold for a wide range of turbine entry temperatures and overall pressure ratios. Consequently, where power density (i.e. weight and/or size of the engine) is the most important factor in the engine design, then turbines having the above properties should be selected.

In order to optimise the overall cycle further, additional parameters can be selected.

One parameter that affects overall system efficiency is Overall Pressure Ratio (OPR) of the first gas turbine engine 11. This can be determined by measuring the total pressure at the air inlet 12, by the total pressure at the outlet of the compressor 14 when the engine is operated at full power. The inventors have found that, in general, higher overall pressure ratios of the first gas turbine engine 11 result in higher overall system efficiency. Typically, the overall pressure ratio of the first gas turbine engine 11 is between 30:1 and 60:1. This contrasts with conventional bottoming cycle systems, in which higher overall pressure ratios does not correlate with increased overall system efficiency, since such systems result in relatively low exhaust temperatures for the bottoming cycle engine, which results in low efficiency for that engine. In conjunction with less than perfect component efficiencies, this typically results in cycle efficiencies peaking at lower overall pressure ratios. On the other hand, in the system presently disclosed, the relatively high exhaust temperatures, even at high OPRs, due to the second combustor 20, results in a highly efficient second gas turbine engine, and so a highly efficient cycle overall.

Similarly, OPR of the second gas turbine engine affects overall system efficiency. Again, the OPR of the second gas turbine engine can be found by dividing the total pressure at the air inlet, by total pressure at the compressor 36 outlet. It has been found that relatively low OPRs of between 3 and 8 provide the greatest overall system efficiency. In many cases, an optimum cycle efficiency is attained from a second gas turbine engine having an OPR of between 4 and 6. Again, this holds over a relatively wide range of turbine entry temperatures and first gas turbine engine OPRs.

A further parameter that affects efficiency is the Turbine Entry Temperature (TET) of the first turbine section 18. The TET can be determined by measuring the total temperature of the gasses entering the inlet of the first turbine section 18 at a maximum engine power condition. It has been found that, in general, in the cycle of the present disclosure, overall efficiency increases as TET increases. Typically, TET is between 1400 Kelvin and 1800 Kelvin, though higher temperatures may be utilised. This is again in contrast with conventional bottoming cycle engines, in which efficiency typically does not increase with increasing turbine entry temperature.

The turbine entry temperature (TET) of the second turbine section 22 also affects thermal efficiency. Again, efficiency typically increases with increasing TET, though it may be desirable to set the TET of the second turbine section 22 at a lower value than the first turbine section 18, to minimise cooling losses.

Figure 3:
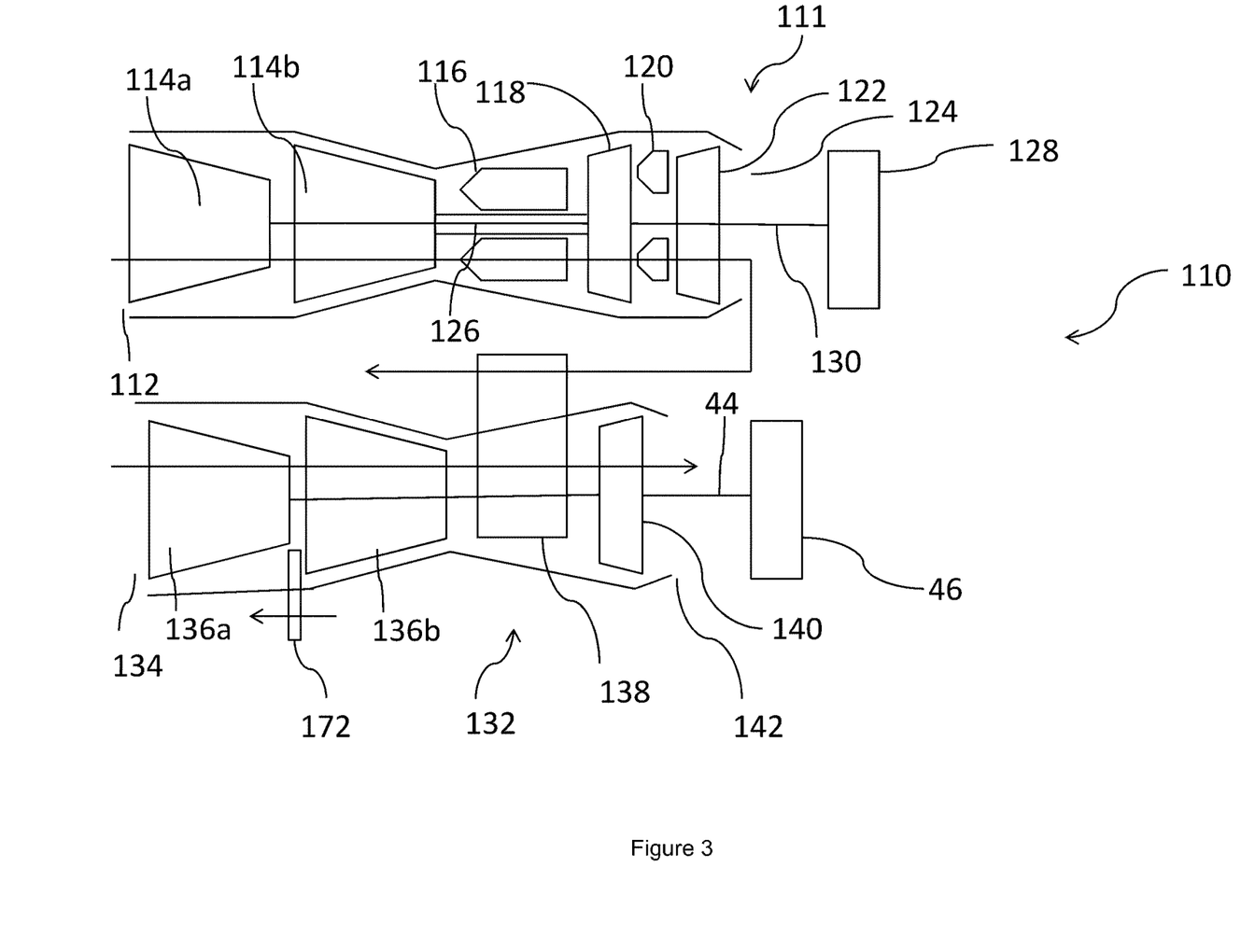
FIG. 3 is a schematic view of a second combined cycle heat engine.

FIG. 3 shows a second combined cycle heat engine 110, which differs from the first heat engine 10 in a number of ways.

In this example, the engine 110 comprises first and second Brayton cycle gas turbine engines, 111, 132, each having a respective principal and rotational axis. The first gas turbine engine 111 comprises, in axial flow series, an air intake 112, a first air compressor 114a, a second air compressor 114b, a first combustor 116, a turbine comprising a first turbine section 118, a second combustor 120, a second turbine section 122 of the turbine, and an exhaust nozzle 124.

Air flows through the engine 110 in a similar manner to the engine 10, as shown by the arrows. In this embodiment, the first turbine section 118 and first compressor 114a are coupled together by a core shaft 126, such that the first turbine section 118 drives the first compressor 114a. The second turbine section 122 is coupled to the second compressor 114b and load such as an electrical generator 128 by a power shaft 130. Consequently, the shafts 130, 126, and so the turbines 118, 122 turn independently of one another. Again, it will be appreciated that the first turbine section 118 is provided as part of a first turbine spool, and the second turbine section 122 is provided as part of a second turbine spool, since they rotate independently of one another.

A second gas turbine engine 132 is also provided, which is similar to the engine 32. The second gas turbine engine comprises, in fluid flow series, an air inlet 134, a first air compressor 136a, an intercooler 172, a second air compressor 136b, a cold side of a recuperating heat exchanger 138, a turbine 140, and a nozzle 142.

Again, air flows through the second gas turbine engine 132 in a similar manner to the engine 32. However, this is slightly modified by the addition of the intercooler 172. The intercooler 172 is a further heat exchanger arranged to cool high temperature air downstream of the first compressor 136a by exchanging heat with ambient air, prior to delivering the cooled air to the second compressor 136b. By cooling the air between compression stages, several effects are achieved. Firstly, the work required to compress the air is increased, thereby increasing the pressure ratio of the engine for a given turbine power. However, this reduces the turbine entry temperature, by reducing the heat added during the cycle, which reduces the efficiency of the engine. Since the second gas turbine engine runs of heat from the first gas turbine engine however, the overall cycle efficiency is increased, since waste heat is utilised, rather than heat from burning fuel.

Figure 4:
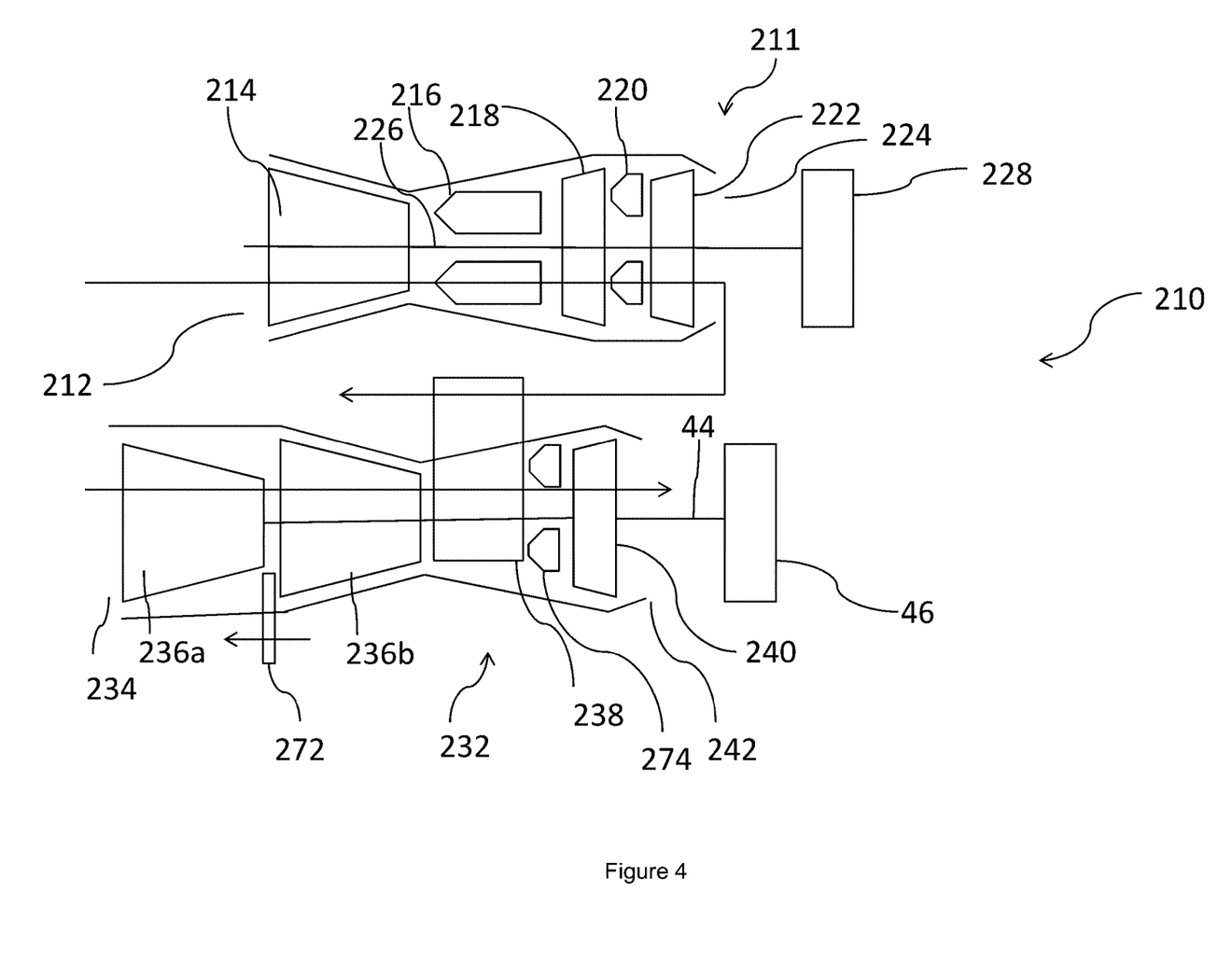
FIG. 4 is a schematic view of a third combined cycle heat engine.

FIG. 4 shows a third combined cycle heat engine 210, which differs from the first and second heat engines 10, 110 in a number of ways.

In this example, the engine 210 comprises first and second Brayton cycle gas turbine engines, 211, 232, each having a respective principal and rotational axis. The first gas turbine engine 211 comprises, in axial flow series, an air intake 212, an air compressor 214, a first combustor 216, a turbine comprising a first turbine section 218, a second combustor 220, a second turbine section 222 of the turbine, and an exhaust nozzle 224.

Air flows through the engine 210 in a similar manner to the engines 10, 110, as shown by the arrows. In this embodiment, each of the first turbine section 218, second turbine section 222 and compressor 214 are coupled together by a core shaft 226, such that both the first and second turbine sections 218, 222 drive the compressor 214. The shaft 226 is also coupled to a load such as an electrical generator 228. Consequently, only a single shaft 226 is provided, such that the first and second turbine sections 218, 222 are provided as part of the same spool.

A second gas turbine engine 232 is also provided, which is similar to the engines 32, 132. The second gas turbine engine comprises, in fluid flow series, an air inlet 234, a first air compressor 236a, an intercooler 272, a second air compressor 236b, a cold side of a recuperating heat exchanger 238, a third combustor 274, a turbine 240, and a nozzle 242.

Again, air flows through the second gas turbine engine 132 in a similar manner to the engine 132. However, this is slightly modified by the addition of the third combustor 274. The third combustor 274 is configured to provide additional fuel to the second airflow, downstream of the heat exchanger 238 and upstream of the turbine 240, to provide further heat addition to the second gas turbine engine 232 air flow. In view of this further heat addition, additional work can be extracted from the second gas turbine engine 232. Furthermore, the turbine entry temperature is raised, thereby increasing the efficiency of the second gas turbine engine 232, and so increasing the efficiency of the heat engine as a whole. In studies, it has been estimated that overall thermal efficiencies as great as 60% can be realistically achieved with such cycles.

Figure 5:
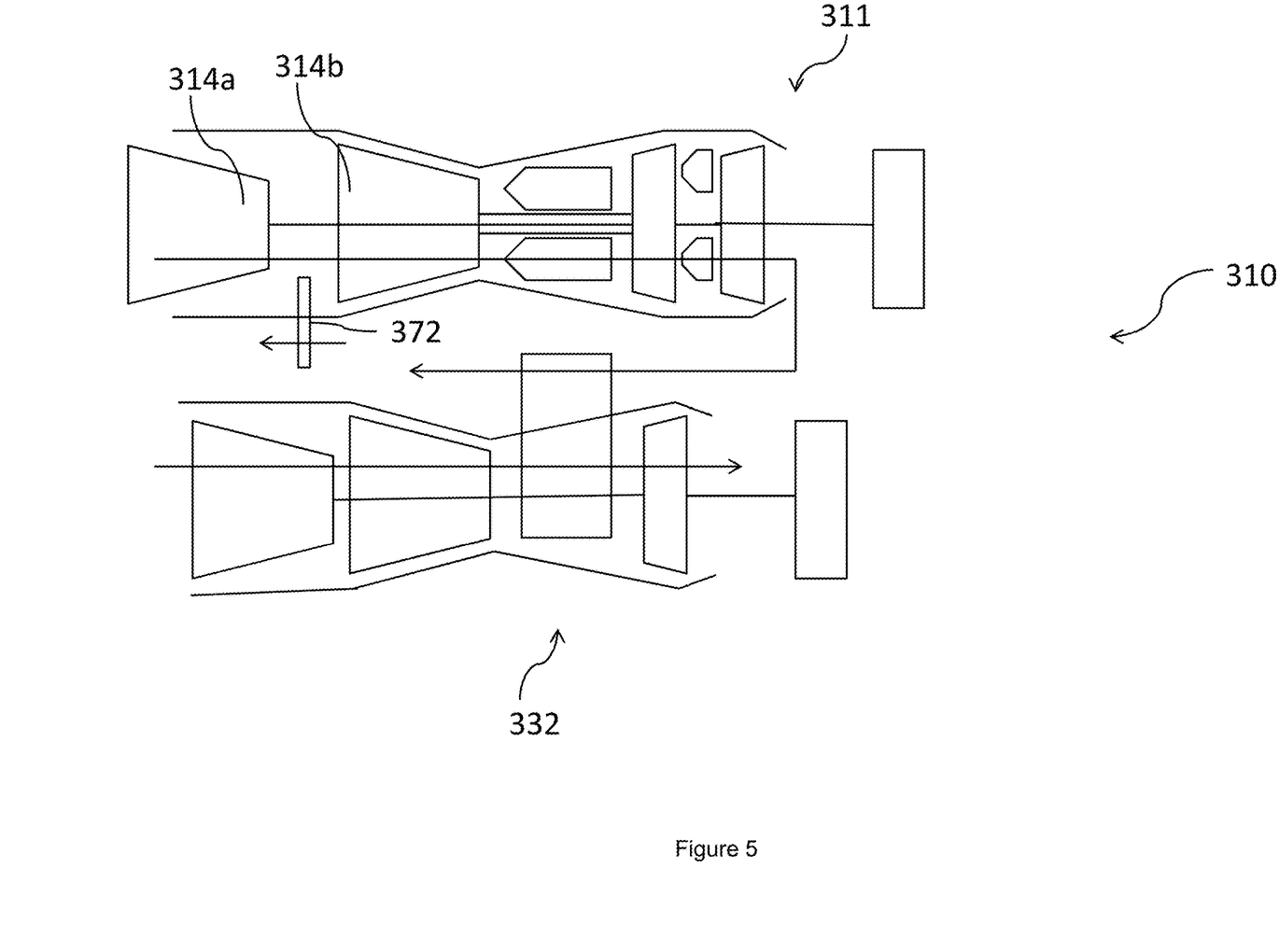
FIG. 5 is a schematic view of a fourth combined cycle heat engine.

FIG. 5 shows a fourth combined cycle heat engine 311. The engine is in many ways similar to the engine 111 of FIG. 3, and so only differences relative to that engine will be described in detail.

The combined cycle heat engine again comprises first and second gas turbine engines 311, 332, which operate in a similar manner to the engines 11, 32, 111, 132 and 211, 232. However, the engine 311 differs to the engines 11, 111, 211 in that an intercooler 372 is provided between compressor stages of the first gas turbine engine 311. In this embodiment, the intercooler 372 is provided between low and high pressure compressors 314a, 314b, and operates in a similar manner to the intercooler 172, 272, in that it cools compressor air prior to further compression, by exchanging heat with a lower temperature fluid, such as lower temperature air, water or some other medium.

The second gas turbine engine 332 could also be provided with an intercooler similar to the intercoolers 172, 272, though in this example the intercooler of the second gas turbine engine 332 is omitted.

By providing an intercooler in the first gas turbine engine 311 rather than or in addition to an intercooler in the second gas turbine engine 332, various advantages can be realised.

Conventionally, intercoolers can be used to reduce the temperature of compressed air prior to further compression by a downstream compressor. This reduces the work required to compress the air, and so allows for a higher efficiency. This also increase the amount of heat that can be added by the combustor without exceeding the temperature limits of the downstream turbines, and so increases power density. However, due to the lower work required for compression, less expansion is required by the turbines to provide the required work, and so temperatures downstream of the turbine are increased. In combination with the heat rejected by the intercooler, this increased heat rejection by the turbine represents enthalpy which is not used in the thermodynamic cycle of the engine, and so overall thermodynamic efficiency is reduced in some cases.

However, in the present case, this increased heat provided by the increased turbine outlet temperature is utilised in the second gas turbine engine 332. Consequently, the efficiency of the second gas turbine engine is raised due to the increased temperature difference between the inlet temperature and the maximum temperature in the heat exchanger, since thermal efficiency is related to this temperature difference by the well known Carnot efficiency equation:

$$\eta = 1 - \frac{T_C}{T_H}$$

Where η represents efficiency, $T_C$ represents the outlet temperature of the cycle, and $T_H$ represents the inlet temperature of the cycle. Consequently, by adding an intercooler 372 to the first gas turbine engine 111, $T_C$ of the first cycle is increased, thereby reducing efficiency of that cycle. However, $T_H$ of the second cycle is then increased by this same amount, thereby maintaining high efficiency for the second engine 332, and so maintaining overall system thermal efficiency. Consequently, this architecture allows for an increase in power density, without a corresponding reduction in thermal efficiency.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the third combustor could be added to the heat engines of either of the first or second embodiment. Similarly, the first embodiment could comprise an intercooler, or the intercooler could be deleted from the second or third embodiments. Similarly, the number or arrangement of shafts could be changed, so that the second combustor could be located between different turbine sections of the same spool, or of different spools in each of the embodiments, depending on requirements. Similarly, where multi-stage turbine spools are provided, the second combustor could be located between any two stages.

The invention claimed is:

1. A combined cycle heat engine comprising:
a first open-cycle gas turbine engine comprising, in flow series, a first air intake, a first air compressor, a first combustion system, a first turbine system, and a first exhaust;
a second open-cycle gas turbine engine comprising, in flow series, a second air intake, a second air compressor, a second turbine system, and a second exhaust; and
a heat exchanger configured to transfer heat from exhaust gas discharged from the first exhaust to compressed air from the second air compressor; wherein
the first combustion system comprises a first combustor downstream of the first air compressor and upstream of the first turbine system, and a second combustor downstream of a first turbine section of the first turbine system and upstream of a second turbine section of the first turbine system; wherein the second open-cycle gas turbine engine does not comprise any combustion equipment.

2. A combined cycle heat engine according to claim 1, wherein the first air compressor, the first turbine section, and the second turbine section are mechanically coupled by a common turbine shaft.

3. A combined cycle heat engine according to claim 1, wherein the first combustor is downstream of the first air compressor and upstream of a first turbine rotor of the first turbine system, and the second combustor is downstream of the first turbine rotor of the first turbine system, and upstream of a second turbine rotor of the first turbine system.

4. A combined cycle heat engine according to claim 1, wherein the first turbine system comprises a first turbine shaft mechanically coupled to a first turbine spool of the first turbine system and the first air compressor of the first open-cycle gas turbine engine, and a second turbine shaft mechanically coupled to a second turbine spool of the first turbine system and an external load.

5. A combined heat cycle engine according to claim 4, wherein the first turbine section is coupled to the first turbine shaft and the second turbine section is coupled to the second turbine shaft.

6. A combined heat cycle engine according to claim 1, wherein the first air compressor comprises a low pressure compressor upstream of a high pressure compressor.

7. A combined heat cycle engine according to claim 4, wherein the first air compressor comprises a low pressure compressor upstream of a high pressure compressor, and the first turbine shaft is mechanically coupled to the high pressure compressor and the second turbine shaft is mechanically coupled to the low pressure compressor.

8. A combined heat cycle engine according to claim 1, wherein the second air compressor comprises a multi-stage compressor comprising two or more rotor stages, and the second open-cycle gas turbine engine comprises one or more intercooler configured to reject heat from the second air compressor, between rotor stages.

9. A combined heat cycle engine according to claim 1, wherein the first air compressor comprises a multi-stage compressor comprising two or more rotor stages, and the first open-cycle gas turbine engine comprises one or more intercooler configured to reject heat from the first air compressor, between rotor stages.

10. A combined heat cycle engine according to claim 1, wherein the second open-cycle gas turbine engine comprises an overall pressure ratio of between 4 and 15.

11. A combined heat cycle engine according to claim 1, wherein a pressure ratio of the first turbine section of the first turbine system is between 2 and 5.

12. A combined heat cycle engine according to claim 1, wherein a pressure ratio of the first turbine section of the first turbine system is between 1 and 2.

13. A combined heat cycle engine according to claim 1, wherein the second open-cycle gas turbine engine comprises an overall pressure ratio of between 5 and 10.

14. A combined heat cycle engine according to claim 1, wherein a pressure ratio of the first turbine section of the first turbine system is between 3.5 and 4.75.

15. A combined heat cycle engine according to claim 1, wherein a pressure ratio of the first turbine section of the first turbine system is 1.5.

16. A combined heat cycle engine according to claim 1, wherein the heat exchanger is configured to transfer heat directly from the exhaust gas discharged from the first exhaust to the compressed air from the second air compressor.

17. A combined heat cycle engine according to claim 1, wherein flow through the second open-cycle gas turbine engine does not include any combustion products.

18. A combined heat cycle engine according to claim 1, wherein the heat exchanger comprises a hot side connected with the first exhaust for receiving exhaust gas discharged from the first exhaust, and a cold side connected between the second air compressor and the second turbine system.

* * * * *